United States Patent [19]

Lanigan, Sr. et al.

[11] Patent Number: 5,511,927
[45] Date of Patent: Apr. 30, 1996

[54] LOAD TRANSFERRING SYSTEM

[75] Inventors: John J. Lanigan, Sr., Orland Park;
John J. Lanigan, Jr., Lynwood;
William P. Lanigan, Orland Park;
Michael T. Lanigan, Lockport, all of Ill.

[73] Assignee: Mi-Jack Products, Inc., Hazel Crest, Ill.

[21] Appl. No.: 384,420

[22] Filed: Feb. 6, 1995

Related U.S. Application Data

[62] Division of Ser. No. 270,329, Jul. 5, 1994, Pat. No. 5,415,517, which is a continuation of Ser. No. 869,433, Apr. 16, 1992, abandoned.

[51] Int. Cl.[6] ................................... B65G 67/02
[52] U.S. Cl. ..................... 414/460; 414/786; 414/392; 414/399
[58] Field of Search ................... 414/786, 390, 414/391, 399, 458, 459, 460, 461, 561, 792.8, 794.6, 795.2, 342, 795.4, 796, 795.9, 796.2, 796.9, 797.5, 790.2, 788.4, 796.1, 392; 212/220, 221, 218, 219, 213, 209, 210; 294/81.1, 81.2, 81.21, 81.51, 81.54

[56] References Cited

U.S. PATENT DOCUMENTS

| Re. 27,905 | 1/1974 | Whiteman | 414/459 |
|---|---|---|---|
| 1,466,296 | 8/1923 | Fitch | 414/342 |
| 2,107,292 | 2/1938 | Fitch | 414/342 |
| 2,701,065 | 2/1955 | Bertel | 212/221 |
| 3,280,998 | 10/1966 | Stevens | 414/459 |
| 3,389,809 | 6/1968 | Wilson | 212/210 |
| 3,784,028 | 1/1974 | Stewart | 212/220 |
| 3,891,100 | 6/1975 | Tamaki et al. | 414/342 |
| 4,149,747 | 4/1979 | Portz et al. | 294/81.21 |
| 4,431,359 | 2/1984 | Toniolo | 414/459 |
| 4,667,834 | 5/1987 | Lanigan et al. | |
| 4,715,762 | 12/1987 | Lanigan, Sr. et al. | |
| 5,183,305 | 2/1993 | Nordstrom et al. | 294/81.2 |

FOREIGN PATENT DOCUMENTS

| 66083 | 8/1975 | Australia | 212/218 |
|---|---|---|---|
| 980727 | 12/1975 | Canada | 414/392 |
| 2341636 | 3/1975 | Germany | 212/218 |
| 3621648 | 1/1988 | Germany | 294/81.53 |
| 360312 | 1/1973 | U.S.S.R. | 212/220 |
| 491577 | 11/1975 | U.S.S.R. | 294/81.54 |
| 727542 | 4/1980 | U.S.S.R. | 414/795 |
| 213807 | 6/1923 | United Kingdom. | |

OTHER PUBLICATIONS

Advertisement plus p. 11 from the Jul./Aug., 1987 issue of the magazine Intermodal Age.
Two photographs from an unknown magazine.

*Primary Examiner*—Frank E. Werner
*Attorney, Agent, or Firm*—Gerstman, Ellis & McMillin, Ltd.

[57] ABSTRACT

A system is provided for transferring loads between railroad cars on different tracks. If desired the system may be highly automated. A series of parallel, adjacent rail car tracks are provided for carrying separate strings of connected railcars in side-by-side relation. A second series of tracks is positioned parallel to and adjacent the first-named series of tracks. A plurality of load lifting mechanisms are provided, these mechanisms being independently movable along the second tracks. The mechanisms each have at least one and preferably a plurality of grapplers capable of lifting a load from one rail car on a first of the rail car tracks and placing the load on another rail car on a second of the rail car tracks. Thus, the plurality of load lifting mechanisms can redistribute the loads of separate strings of connected rail cars.

7 Claims, 5 Drawing Sheets

LOAD TRANSFERRING SYSTEM

This is a division of application Ser. No. 08/270,329, filed Jul. 5, 1994, now U.S. Pat. No. 5,415,517, which is a continuation of application Ser. No. 07/869,433, filed Apr. 16, 1992, abandoned.

BACKGROUND OF THE INVENTION

Millions of trailers and containers are shipped by rail in the United States every year on flat cars which are built for the purpose. When freight trains arrive at an intermediate destination, often, the various containers and trailers must be taken off the flat cars and trucked to another terminal to be loaded on another freight train that is going to the next destination. Thus, a trailer or container load of goods may be loaded on to two or more freight trains and several different trucks as it passes from the shipper toward its ultimate destination.

Specifically, on a conventional highway interchange for railroad loads, a container arrives at a railroad terminal and is lifted off the train, spotted, and stored. A drayage firm picks up the container, goes through a check gate, and then drays the container across town. The container then is inspected upon arrival at the next railroad terminal, and is spotted for loading. Then, a second crane is used to load the container on to its connecting train.

Currently, the cost of unloading a container plus costs of inspection, paper work, insurance and theft is on the order of $52.00 per container. Additionally, the drayage cost for moving a container from one railroad terminal to another in a large city may be $50.00 per container.

By this invention, a throughport interchange terminal is proposed which would be used by several railroad lines, rather along the line of an air terminal hub concept as is used by the major airlines of the United States. The throughport interchange terminal could be serviced by many railroad carriers to provide access to all major corridors of traffic in one convenient location. A shipper's container would arrive at the terminal in time to meet its connecting train and be transferred quickly and efficiently without costly cross town delays. By this invention, improvements are provided that particularly facilitate this concept.

Specifically, at a throughport terminal interchange of the type of this invention there may be only one handling charge per container, which at current rates can also avoid drayage costs and save about $50.00 per container. Also, in a conventional terminal flat cars can be held from 12 to 24 hours before being released with their load to earn revenue. In a throughport terminal interchange of this invention, for example an interchange capable of handling 490 containers at a time, there can be a very substantial reduction in idle time because of the efficient characteristics of the system. Also, the terminal of this invention can eliminate hostlers and chassis. Theft and damage due to handling can be reduced, and better tracking of in-shipment containers can be supplied along with a reduction of operating personnel.

The throughport terminal interchange of this invention can be placed on a relatively small area of land, for example 47 acres for a terminal having a holding capacity of 490 containers and trailers. Little dedicated container storage area is necessary, along with great reductions in parking requirements for the chassis or hostlers, which are typically not needed.

Furthermore, the operation of the throughport interchange terminal of this invention can be substantially automated for great savings of time and expense.

DESCRIPTION OF THE INVENTION

By this invention, a system is provided for transferring loads such as semitrailers and railroad car containers between railroad cars on different tracks. The system comprises a series of parallel, adjacent railcar tracks for carrying separate strings of connected rail cars in side-by-side relation. Second track means are also provided, positioned parallel to and adjacent the series of tracks.

A plurality of load lifting mechanisms are provided, the mechanisms being independently movable along the second track means. The mechanisms each have at least one grappler means capable of lifting a load from one railcar on a first of the railcar tracks and placing the load on another railcar on a second of the railcar tracks. Thus, the plurality of load lifting mechanisms can redistribute the loads of the separate strings of connected railcars.

It is preferred for the load lifting mechanisms to each have a plurality of the grappler means, plus means for moving each grappler means transversely of the series of tracks. Also, the grappler means are preferably capable of lifting and moving a load which comprises a stack of containers. Such grappler means are known per se, as shown in Lanigan et al. U.S. Pat. Nos. 4,667,834 and 4,715,762.

Specifically, each grappler means of this invention typically comprises a frame, a plurality of columns carried by and extending downwardly from the frame, first container gripping means carried by the columns for releasably gripping at least one container of the load, and means for raising and lowering the grappler means. More specifically, the first container gripping means defines side latches for simultaneously carrying one container adjacent its top and another container adjacent its bottom so that a stack of at least two containers may be lifted by the first container gripping means.

Additionally, it is preferred for the grappler means to further comprise second container gripping means, carried by the frame, for gripping the top wall of a container. Thus, a stack of at least three containers may be lifted, one being carried by the second container gripping means, and two being carried by the first container gripping means.

Additionally, it is desirable for the columns described above to define extensible and retractable first sections, plus first means for effecting and controlling the extension and retraction of the first sections, to vary the height of the grappler means to correlate with the load to be lifted.

It is also preferable for the first container gripping means to define a pair of spaced, parallel side arms extending transversely at the series of tracks. The side arms may define extensible and retractable second sections, plus second means for effecting and controlling the extension and retraction of the second sections, to vary the transverse extension of the side arms in a manner to correlate with the load to be lifted.

Thus, loads of different size may be lifted by the grappler system of this invention, with both the height and the width of the grappler system being adjustable to enter into proper engagement with the load or loads for lifting.

It is also preferable for each side arm of the container gripping means to carry at least four of the side latches for carrying containers, so that a pair of abutting containers in side-by-side relation (which includes end-to-end relation) may be lifted by the grappler means.

Thus, by this invention, it becomes possible to shift a large number of loads between the various rail cars of freight trains which are in side-by-side relation with each other, without the need for carrying the loads between terminals, or placing the loads in any drayage conveyance. Rather, the load lifting mechanisms are capable of directly shifting loads between respective freight trains in accordance with a program for directing the loads to different destinations. Furthermore, the system of this invention is capable of a major amount of automation, in which most or all of the load shifting process may be automatically accomplished without direct human intervention other than supervision that the process is proceeding in proper manner.

DESCRIPTION OF SPECIFIC EMBODIMENT

Figure 4:
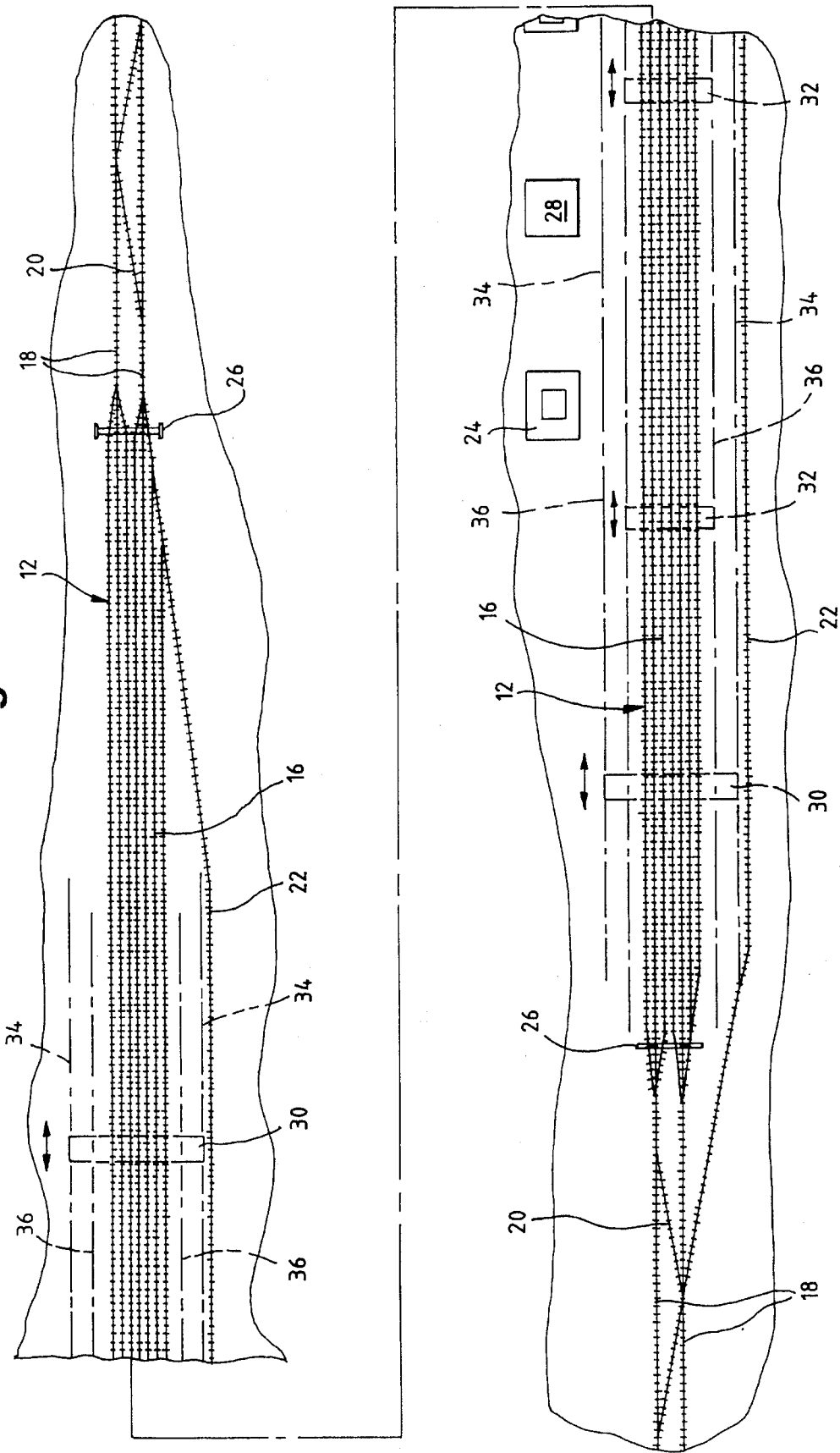
FIG. 4 is a reduced-scale plan view of the trackage used in accordance with this invention, with the load lifting mechanisms and their individual trackage shown in diagrammatic manner.

Referring to the drawings, FIGS. 1–4 disclose a specific embodiment of a system 10 for transferring loads between railroad cars on different tracks. FIG. 4 shows a reduced scale, top plan view of a trackage layout in accordance with this invention in which a system or series 12 of parallel, adjacent rail car tracks are provided for carrying separate strings of connected railcars 14 (FIG. 1) in side-by-side relation. FIG. 4 shows that the specific embodiment has seven parallel tracks 16 which extend a substantial distance, for example 3,900 or 4,000 feet, with the tracks then joining together, as shown, into pairs of access tracks 18 at each end of the system.

As is conventional, angled tracks 20 are provided to permit shifting of trains from one of the access tracks 18 to the other. Also, a bypass track 22 is provided to permit trains to pass around the trackage system 12 without entering into it.

A control tower 24 may be provided, along with signal towers 26 at each end of the track system 12. A maintenance building 28 for housing maintenance equipment and the like may also be provided.

In accordance with this invention, a plurality of load lifting mechanisms 30, 32 are provided. As seen particularly in FIG. 4, these mechanisms 30, 32 are independently movable each along second tracks 34, 36, which are of differing widths to accommodate the differing widths of load lifting mechanisms 30, 32. The differing widths of mechanisms 30, 32 permit mechanisms 30, 32 to move past each other, with each mechanism 32 passing underneath mechanism 30, while carrying loads along track system 12 to desired destinations. Two each of mechanisms 30 and 32 are provided in this embodiment.

Apart from differing size and width, load lifting mechanisms 30, 32 may be of similar construction, each comprising a large lifting frame 38, 40, each having a pair of downwardly depending, opposed legs 42, 44, with each of legs 42, 44 terminating in a plurality of rail car wheel trucks 46, in sufficient number and strength to carry the load of each of lifting mechanisms 30, 32 on their respective rails 34, 36.

Figure 1:
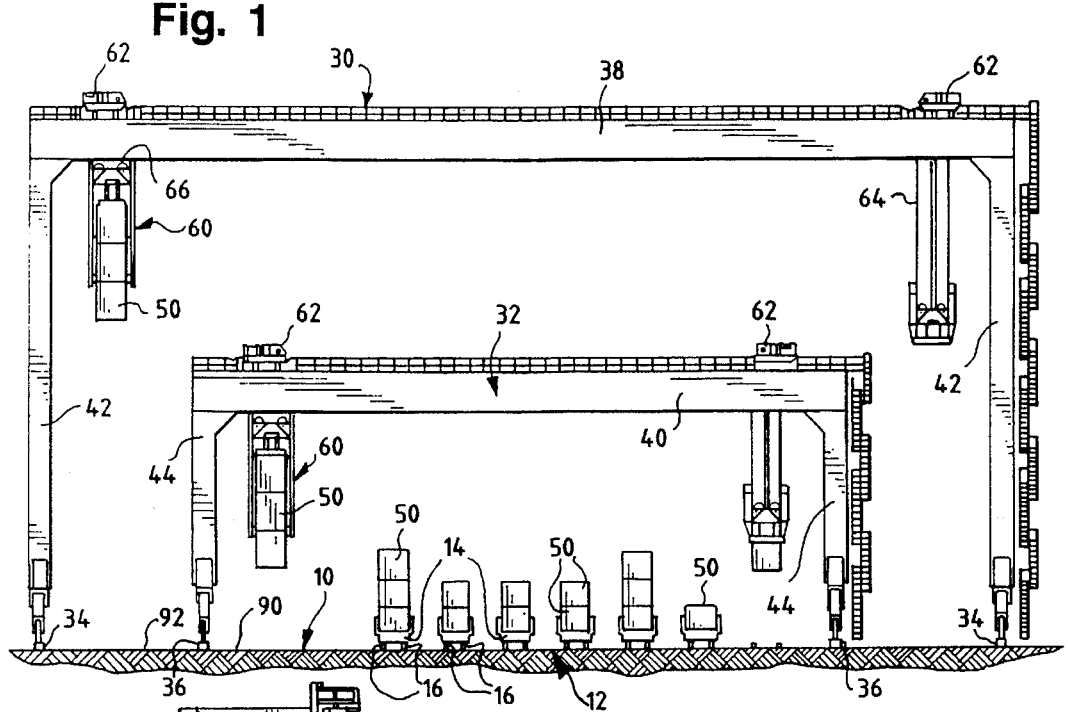
FIG. 1 is an elevational view of two load lifting mechanisms which are used in the system of this invention, shown to be transversely positioned across a series of parallel, adjacent rail car tracks in accordance with this invention.
Figure 2:
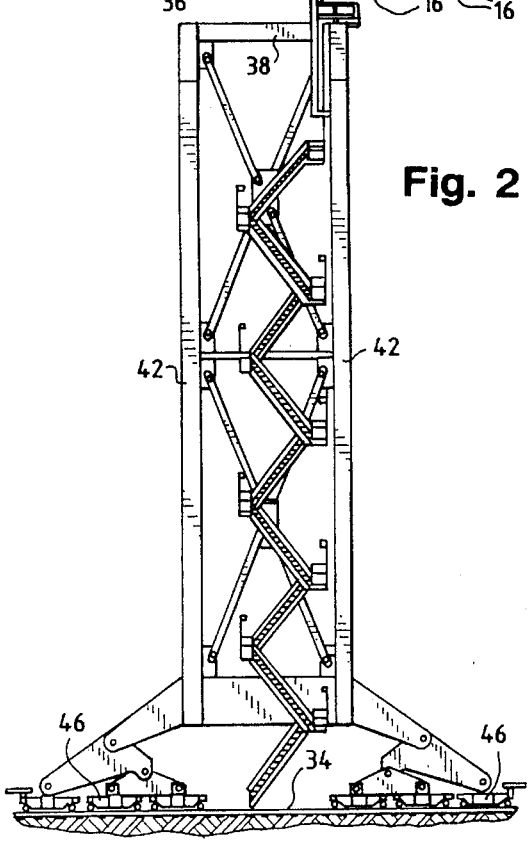
FIGS. 2 and 3 are respective elevational views, taken at 90 degrees from the view of FIG. 1, of each of the load lifting mechanisms shown therein.
Figure 3:
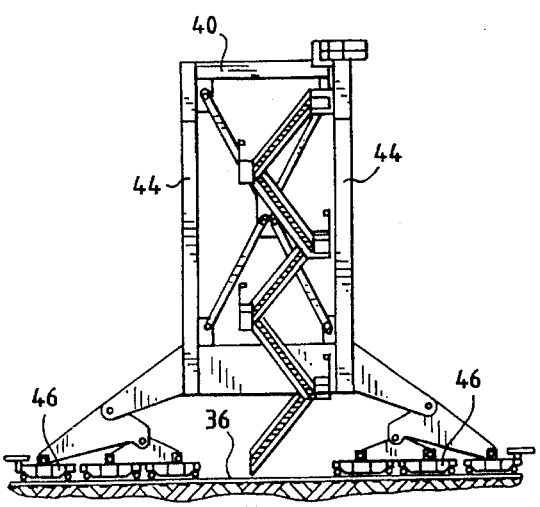

FIG. 1 shows rail car track system 12 having six strings of rail cars 14 carried thereon on separate rails 16 in side-by-side relation. Each of the rail cars 14 that are shown carry a pair of containerized loads 50 in a stack of one, two, or three loads.

These containerized loads 50 may be of conventional design, being presently of use in the railroad industry. The containers 50 as shown particularly in FIGS. 5–8, carry corner apertures 52, 54 into which a latch or pin may be inserted to grip and lift the containers. At the present time, such containers are now gripped from the top by a crane having a special top-gripping mechanism that is conventionally used to engage apertures 52 or 54.

In accordance with this invention, the respective load lifting mechanisms 30, 32 each carry a pair (or more) of grappler or stringer mechanisms 60. Each of grappler mechanisms 60 carries a traversing mechanism 62 permitting them to move back and forth along their respective frame 38 or 40 in a direction transverse to tracks 16. Grapplers or stringers 60 are carried by cables 64 which wrap around pulley wheel 66, plus lifting means carried by each load lifting mechanism 30, 32, to raise and lower grapplers 60 by means of cables 64 and pulley wheels 66 as may be desired.

Figure 5:
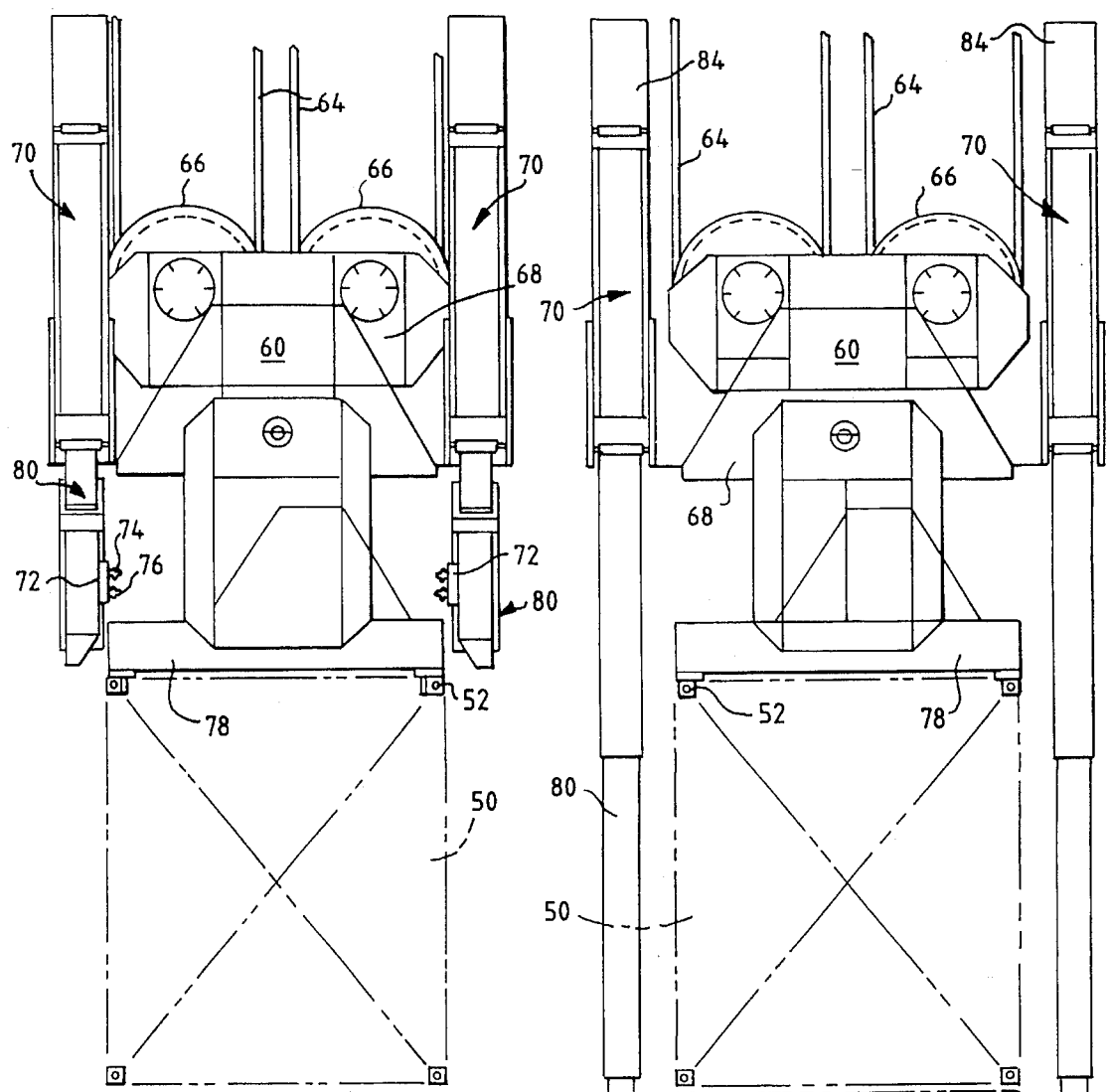
FIG. 5 is a fragmentary, elevational view of a grappler carried by one of the load lifting mechanisms, shown in the process of carrying a single, containerized load.
Figure 6:
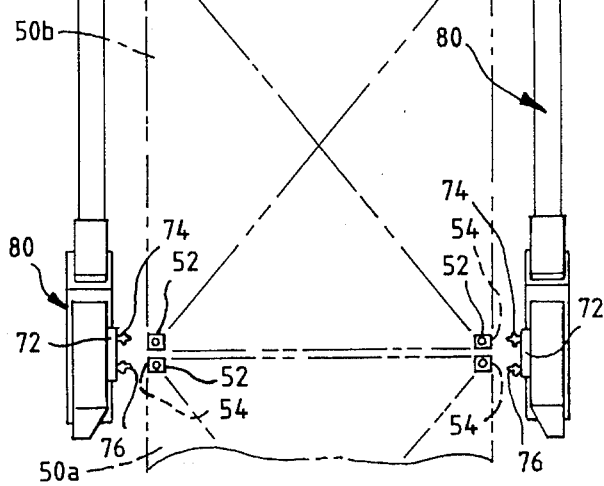
FIG. 6 is a fragmentary, elevational view of the same grappler shown in the process of carrying a stack of three of said containerized loads.

As shown in FIGS. 5 and 6, grapplers 60 each comprise a frame 68 which carries a plurality of columns 70, extending downwardly from the frame.

FIGS. 5 and 6 show first container gripping means 72, comprising a pair of conventional, extensible and retractable upper and lower pins or side latches 74, 76. Each of grapplers 60 also carry a conventional "top pick" or top attachment mechanism 78 in connection with respective apertures 52 or 54 of containerized loads 50.

Thus, as shown in FIG. 5, grappler 60 has grasped a containerized load 50 from the top and is holding it. Columns 70 define extensible and retractable sections 80 which carry the side latches 74, 76, so that the columns can be extended downwardly and retracted upwardly. FIG. 5 shows the columns 70 retracted upwardly in a position to be out of the way as single container 50 is carried by top mechanism 78. FIG. 6 shows how columns 70 may be downwardly extended by a hydraulic system which is conventional and thus not shown in detail, so that the respective upper and lower latches 74, 76 may engage with lifting side apertures 54, or alternatively end apertures 52 with appropriately-sized container, simultaneously carrying one container 50*a* at its top and another container 50*b* adjacent its bottom. Thus a stack of three containers is lifted, two of the containers 50*a*, 50*b* being carried by columns 70, and one of the containers being carried by top pick mechanism 78.

Additionally, it can be seen that a stack of two containers may be similarly carried, if desired. In this instance, it may be desirable to retract columns 70 to a certain degree to attach container 50*b* adjacent its top rather than adjacent its bottom, and with the top pick mechanism 78 carrying the other container of the stack of two. Also a single container may be picked up by one set of latches 74 or 76, if desired, or a stack of two containers may be picked up using both sets of latches 74, 76.

It can also be seen that by appropriate and independent operation of the retractable latch pins 74, 76, and operation of the top pick mechanism 78, that the respective containers in the stack of three in FIG. 6 can be released at a new destination in any desired manner. Bottom container 50*a* may be dropped off while the other containers are retained. The bottom two containers may be dropped off, if desired, or all three of them may be dropped off. Similarly, other containers may be picked up while the grappler 60 is carrying either the top container or the top two containers 50, 50*b*, as may be desired to provide a flexible, versatile system.

Extensible columns 70 also provide stability that reduces swinging of the stacked load about lifting cables 64.

Figure 7:
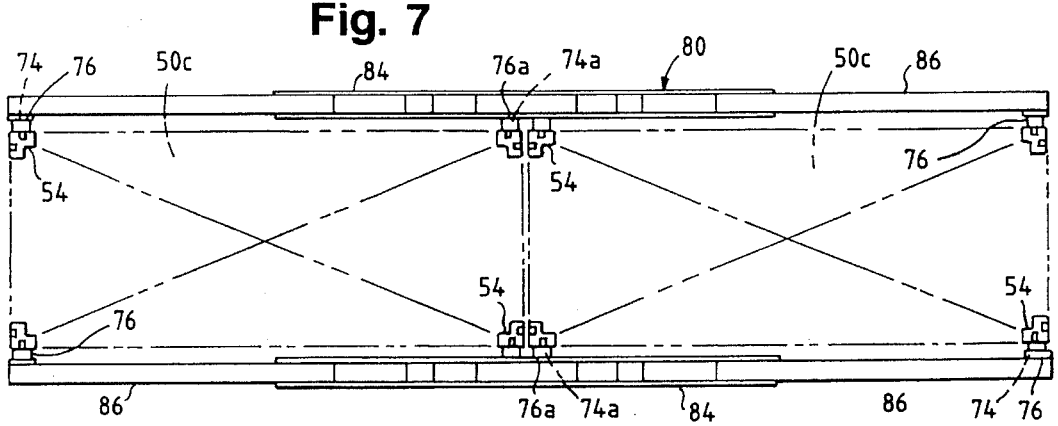
FIG. 7 is a bottom plan view, in simplified form for purposes of illustration, showing how the grappler of FIG. 5 can carry a pair of containerized loads positioned in end-to-end relation.
Figure 8:
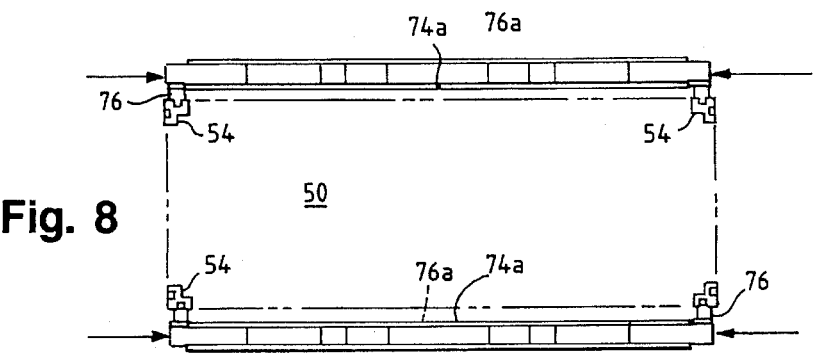
FIG. 8 is a bottom plan view similar to FIG. 7 showing the same grappler carrying a single containerized load.

The extensible first section 80 of the columns not only extends upwardly and downwardly, but it is laterally extensible by conventional hydraulic means as well, as shown in FIGS. 7 and 8. In FIG. 7, first section 80 of the grappler columns 70 defines a pair of spaced side arms 84 extending typically parallel to the series of tracks 12. Side arms 84 define extensible and retractable second sections 86, with conventional hydraulic means being used to control the extension and retraction of second sections 86, to vary the transverse extension of side arms 84 to correlate with the load to be lifted. It can be seen that side latch members 74, 76 are carried on the ends of said side arms, but with side latches 76 only being shown in FIGS. 7 and 8 since it is a bottom plan view, and side latches 74 are thus blocked from view. However, latches 74 and 76 are capable of engaging with the respective lifting side apertures 54 shown in the containers 50 of FIGS. 7 and 8.

Furthermore, side arms 84 carry a central set of side latch pins 74*a*, 76*a* which are equivalent to side latches 74, 76, with side latches 76*a* being shown in FIG. 7 and 8. The side latches 74*a* corresponding to latches 74 are of course obscured by the bottom view of FIGS. 7 and 8, but are there, so that a pair of containers 50*c*, as shown in FIG. 7 in abutting, side-by-side relation, may be carried by the series of latches. Each side arm 84 and its extensible and retractable second sections 86 thus carry a total of 8 side latches 74*a*, 76*a* in two rows of four each, in order to carry two levels of containers in abutting, side-by-side relation, if desired.

Alternatively, as shown in FIG. 8, a single container 50 may be engaged for lifting, with second sections 86 being retracted so that the respective side latches 74, 76 are spaced from each other by the length or width of a single container 50. In this case central side latches 74*a*, 76*a* are retracted and not used.

Figure 9:
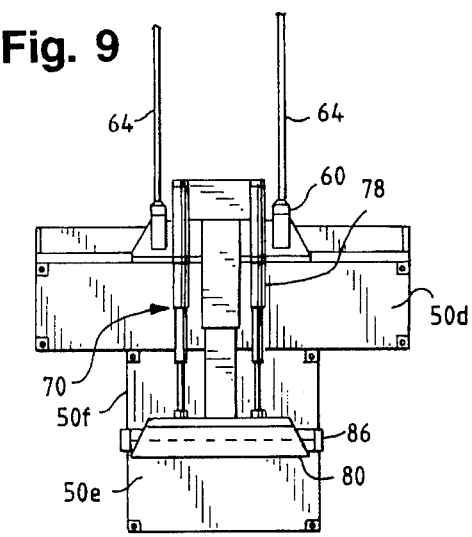
FIGS. 9 and 10 are reduced scale elevational views showing how a grappler carried by a load-lifting mechanism of this invention can carry differing stack arrangements and sizes of containerized loads in accordance with this invention.

Referring to FIG. 9, a side view of grappler 60 of this invention is disclosed, showing the grappler to be holding a stack of containers, in which a long container 50*c* or a pair of abutting containers is picked up by the top pick mechanism 78. Then, respective columns 70 are extended to place first container gripping means 80 adjacent to a pair of stacked, shorter containers 50*e*, 50*f* in engagement as shown for example in FIG. 8. In this instance, first section 86 is retracted to permit the lifting of a plurality of containers of different length.

Figure 10:
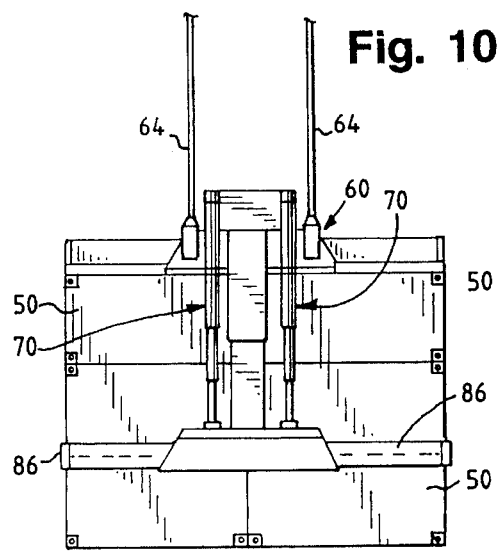

Referring to FIG. 10, the same columns 70 are to be shown positioned with the side arms of second sections 86 being expanded to permit the picking up of three layers of abutting containers 50, for a total of six containers lifted in a stack of three layers of abutting containers.

It can thus be seen that great flexibility and versatility of use is provided in the system of this invention for the picking up and moving of containers in a wide variety of configurations, as desired by the user.

Referring to diagrammatic FIGS. 11A–11I, it is illustrated how a pair of the grapplers or spreaders 60 of this invention respectively labeled "SPRD 1" and "SPRD 2" can be used to transfer, store, and shift various containerized loads 50, which are labeled in accordance with their row (1,2, or 3) and whether they are initially top or bottom on the stack ("B" or "T"). The respective loads are carried in three railroad cars 14 in side-by-side relation, but it is also possible that the respective railroad cars may be longitudinally spaced from each other along track array 12 as well as being on different tracks. It has been shown that the load lifting mechanisms are capable of not only moving a load sideways from track to track by means of traversing mechanisms 62 (FIG. 1), but also the load lifting mechanisms are capable of moving loads longitudinally along the track array 12 by the rolling of railwheel trucks 46 along the respective tracks 34, 36. The diagrams of FIG. 11 are intended to illustrate both situations in an exemplary and simplified manner. Also one should note that the specific system of this invention has four grapplers, while only two grapplers 60 are shown in use in FIG. 11. Thus, in reality, a much more complex load shifting process can take place with the invention of this application.

Figure 11A:
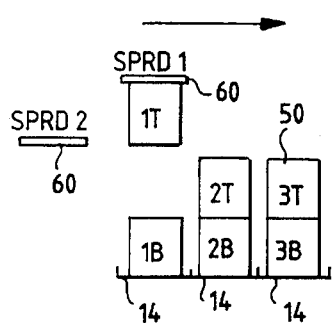
FIGS. 11A–11I are diagrammatic views showing how grapplers carried by the load lifting mechanisms of this invention can in effect shuffle the containerized loads of several railcars to and through various desired configurations.
Figure 11B:
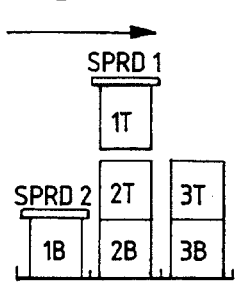
Figure 11C:
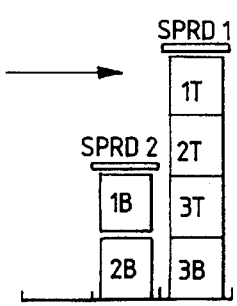
Figure 11D:
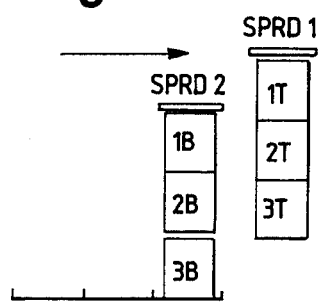
Figure 11E:
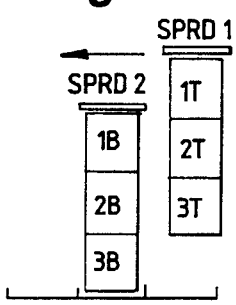
Figure 11F:
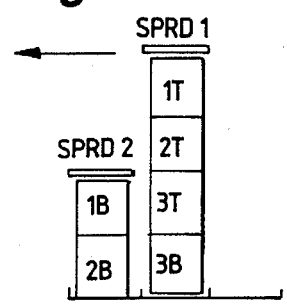

In FIG. 11A, spreader 1 picks up load 1T from track 1 and moves it to track two as shown in FIG. 11B. There, spreader 1 advances its columns 70 to pick up and move load 2T as well, and spreader 2 picks up load 1B and deposits it on top of load 2B, as in FIG. 11C. Spreader 1 in FIG. 11D picks up a stack of three loads 1T, 2T and 3T, while spreader 2 deposits loads 1B and 2B on load 3B on the third track. Spreader 1 moves its carried loads out of the way to permit this to happen. Then, in FIG. 11E, spreader 2 moves the whole load from the third track to the middle track, and drops off load 3B. Then, in FIG. 11F, spreader 2 removes loads 1B and 2B and deposits them on the first, left hand track, while spreader 1 deposits its load on top of load 3B.

Figure 11G:
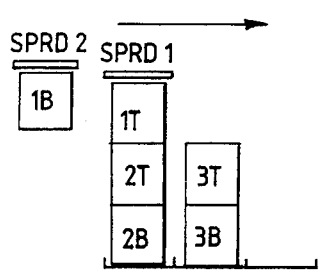
Figure 11H:
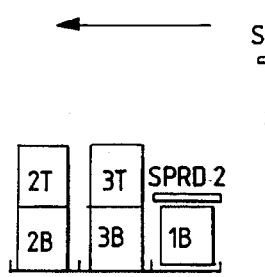
Figure 11I:
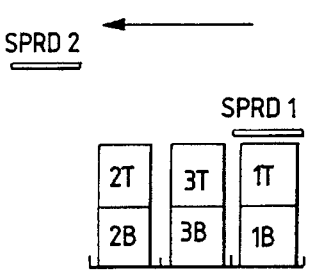

In FIG. 11G, spreader 2 takes load 1B and moves it out of the way to the left, while spreader 1 deposits load 3T on load 3B of the middle track, and takes loads 1T and 2T and puts them on load 2B. Then, in FIG. 11H spreader 1 takes load 1T, moving it out of the way to the right, while spreader 2 takes load 1B and puts it on the right hand track. Then, in FIG. 11I, spreader 1 deposits load 1T on load 1B, to complete the process of redistributing the respective loads on different trains bound for different destinations.

The above process can be accomplished in an automated manner. Inbound consist information from incoming railroad trains may be sent to a computer, comprising the arrangement and sizes of the loads on the trains, and their desired destinations. This is then computed to determine how the leads should be distributed to the respective trains on the parallel tracks 12. The computer can compute the optimum paths of operation of the respective load lifting mechanisms to permit this to be done with maximum efficiency, in operations similar to that illustrated in FIGS.

11A–11I. Then, when the trains are in and positioned in side-by-side relation on track array 12, the computer can direct the respective cranes 30, 32, and their grapplers or spreaders 60, for essentially automated shifting of the loads between the trains.

Container storage areas 90, 92 FIG. 1 along side track array 12 may be used to temporarily hold containers 50, pending their loading on new cars for further transportation, or for pickup.

It is believed that the specific embodiment of the throughport interchange terminal shown herein, being capable of holding 400 to 800 containers, and typically about 490 containers, is capable of receiving two 13 car trains every 15 minutes. Refueling capability can of course be provided to the engines during the load shifting process, while crew changes provided for and container status information are provided to the railroads. Such a terminal should be capable of interchanging about 164 containers per hour at normal operating speeds, and about 490 containers may be interchanged in about 3 hours.

These interchange trains would typically be dedicated for use in the system of this invention, being preblocked per the instructions of the throughport terminal operator at their origin in accordance with available outbound positions. By utilizing all 48 foot-stack cars, when the trains are set, all positions of the various lifting ports 52, 54 of the containers will be directly across from each other, and will provide for quicker handling.

It can also be seen that in such a circumstance, the system of this invention is capable of handling containers of different sizes. This sizing information can be processed by a computer to provide optimum loading by destination on board the various interchange trains on the array of tracks.

The above has been offered for illustrative purposes only, and is not intended to limit the scope of the invention of this application, which is as defined in the claims below.

That which is claimed:

1. A method for transferring loads between railroad cars on a series of parallel, adjacent rail car tracks for carrying separate strings of connected rail cars in side-by-side relation, which comprises the steps of:

providing a ground supported first lifting frame extending over said parallel tracks and movable parallel to said parallel tracks;

providing on said lifting frame a grappler which is moveable transversely with respect to said tracks;

moving the grappler along said lifting frame and transversely with respect to said tracks to a position overlying a first railroad car carrying a load;

operating said grappler to lift the load from said first railroad car;

moving said grappler with said lifted load transversely with respect to said tracks to overlie a second railroad car in which said load is to be placed;

operating said grappler to lower said lifted load and to deposit said load directly onto said second railroad car;

providing a second lifting frame that is ground supported at generally the same elevational level as the first lifting frame overlapping the first lifting frame and movable parallel to said parallel tracks and parallel to the movement of said first lifting frame;

providing on said second lifting frame a second grappler which is moveable transversely with respect to said track;

moving said second grappler along said second lifting frame and transversely with respect to said tracks to a position overlying a third railroad car carrying a load;

operating said second grappler to lift a load from said third railroad car;

moving said grappler with said lifted load transversely with respect to said tracks to overlie a fourth railroad car in which said load is to be placed; and operating said second grappler to lower said lifted load and to deposit said load directly onto said fourth railroad car.

2. A method as defined by claim 1, including the step of moving said first mentioned lifting frame and grappler in a direction generally parallel to said tracks after the load is lifted from the first railroad car and before the load is deposited by said grappler onto the second railroad car.

3. A method as defined by claim 1, including the step of providing on said first mentioned lifting frame a second grappler which is moveable transverse to said tracks.

4. A method as defined by claim 1, including the step of providing on said first mentioned lifting frame a third grappler which is moveable transverse to said tracks.

5. A method as defined by claim 1, including the step of providing on said second lifting frame a fourth grappler which is moveable transverse to said tracks.

6. A system for transferring loads between railroad cars on a series of parallel, adjacent rail car tracks for carrying separate strings of connected rail cars in side by side relation, which comprises:

a first ground supported lifting frame extending over said parallel tracks and movable parallel to said parallel tracks;

a first grappler on said lifting frame which is movable transversely with respect to said tracks;

a second grappler on said lifting frame which is movable transversely with respect to said tracks;

a second lifting frame that is ground supported at generally the same elevational level as the first lifting frame, the second lifting frame overlapping the first lifting frame and movable parallel to said parallel tracks and parallel to the movement of said first lifting frame;

a third grappler on said second lifting frame which is movable transversely with respect to said tracks;

a fourth grappler on said second lifting frame which is movable transversely with respect to said tracks; and means for moving said grapplers and lifting frames.

7. A system for transferring loads between railroad cars on a series of parallel, adjacent rail car tracks for carrying separate strings of connected rail cars in side by side relation, which comprises:

a first ground supported lifting frame extending over said parallel tracks and movable parallel to said parallel tracks;

a first grappler on said lifting frame which is movable transversely with respect to said tracks;

a second lifting frame that is ground supported at generally the same elevational level as the first lifting frame, the second lifting frame overlapping the first lifting frame and movable parallel to said parallel tracks and parallel to the movement of said first lifting frame;

a second grappler on said second lifting frame which is movable transversely with respect to said tracks; and means for moving said grapplers and lifting frames.

* * * * *